United States Patent [19]

Hardison

[11] Patent Number: 5,292,440

[45] Date of Patent: Mar. 8, 1994

[54] REMOVAL OF HYDROGEN SULFIDE FROM SOUR WATER WITHOUT LOSS OF HEAVY METAL

[75] Inventor: Leslie C. Hardison, Barrington, Ill.

[73] Assignee: Ari Technologies, Inc., Palatine, Ill.

[21] Appl. No.: 934,575

[22] Filed: Aug. 24, 1992

[51] Int. Cl.$^5$ ............................................. C02F 1/74
[52] U.S. Cl. ................................... 210/712; 210/721;
210/763; 60/641.2; 60/641.3; 60/641.5;
423/573.1
[58] Field of Search ................ 60/641.2, 641.3, 641.5;
210/712, 721, 718, 750, 758, 763, 765, 916;
423/573.1

[56] References Cited

U.S. PATENT DOCUMENTS

| | | | |
|---|---|---|---|
| 4,076,621 | 2/1978 | Hardison | 210/60 |
| 4,363,215 | 12/1982 | Sharp | 60/641.2 |
| 4,410,432 | 10/1983 | Domahidy | 60/641.2 |
| 4,414,817 | 11/1983 | Jernigan | 60/641.2 |
| 4,451,442 | 5/1984 | Jeffrey et al. | 423/224 |
| 4,468,929 | 9/1984 | Jernigan | 60/641.2 |
| 4,614,644 | 9/1986 | Lampton, Jr. et al. | 423/226 |
| 4,629,608 | 12/1986 | Lampton, Jr. et al. | 423/226 |
| 4,696,802 | 9/1987 | Bedell | 60/641.2 |
| 4,784,775 | 11/1988 | Hardison | 210/712 |
| 4,844,162 | 7/1989 | Maassen et al. | 60/641.2 |
| 4,967,559 | 11/1990 | Johnston | 60/641.2 |
| 4,968,488 | 11/1990 | Spevack | 60/641.2 |
| 5,057,292 | 10/1991 | Monticelli, Jr. | 423/226 |

Primary Examiner—Neil M. McCarthy
Attorney, Agent, or Firm—Allegretti & Witcoff, Ltd.

[57] ABSTRACT

A process for removal of dissolved $H_2S$ from condensed geothermal steam that includes the steps of cooling and oxygenating the sour steam condensate by contacting the sour condensate with air in a cooling tower; collecting the oxygenated condensate in a cooling tower collection basin and initially adding a polyvalent metal chelate catalyst, e.g., iron chelate catalyst solution, to the sour condensate at a very low concentration, e.g., about 0.1 ppm to about 10 ppm, preferably about 0.5 ppm to about 1 ppm by weight, and periodically or continuously adding, to the solution, a chelating agent for the polyvalent metal to account for chelon degradation to maintain active polyvalent metal chelate solution at a concentration of about 0.1 ppm to about 10 ppm, preferably about 0.5 ppm to about 1 ppm by weight. The dissolved $H_2S$ is removed, by oxidation to sulfur, without the addition of polyvalent metal, e.g., iron, to the solution, and without blowdown of the condensate circulated through the cooling tower.

12 Claims, 1 Drawing Sheet

REMOVAL OF HYDROGEN SULFIDE FROM SOUR WATER WITHOUT LOSS OF HEAVY METAL

FIELD OF THE INVENTION

This invention relates to a novel and improved process and apparatus for the treatment of so-called "sour water" to remove dissolved hydrogen sulfide and is an improvement over the process and apparatus disclosed in U.S. Pat. Nos. 4,784,775 and 5,057,292. More particularly, the present invention is directed to a process and apparatus for the removal of hydrogen sulfide from "sour water" condensate from a geothermal power plant with more complete retention of polyvalent metal, e.g., iron, in the catalytic heavy metal chelate removal of $H_2S$. The process requires replacement of degraded chelon with fresh chelate solution, but substantial additional heavy metal, e.g., iron, is not required to maintain an effective catalyst concentration. While prior art processes for treatment of sour water condensate from a geothermal power plant have required discard of about $\frac{1}{3}$ of the condensate to a deep well in the earth, the process of the present invention operates most efficiently with only a 1% to 2% discard of condensate, and can operate efficiently with 0% to about 10% by weight condensate discard.

BACKGROUND OF THE INVENTION

Industrial waste water containing dissolved hydrogen sulfide presents a significant pollution problem because of its high toxicity and unpleasant odor, even at low concentrations. The treatment of such waste water is necessary before discharging it to the environment to reduce the hydrogen sulfide content to acceptable levels. The present invention provides a simple and effective method of removing hydrogen sulfide from such waste water streams by the initial addition of a chelated heavy metal catalyst, e.g., iron chelate solution, and, thereafter, adding mostly chelate solution, to replace degraded chelon, while retaining nearly all of the heavy metal in solution (about 90% to about 100%, preferably 95% to 100% by weight).

Typical sour water streams are those produced in oil refineries by water washing of sour liquid hydrocarbons and various cooler and condenser surfaces. Condensation of geothermal steam also produces sour water which requires treatment. Although the present invention may be used for the treatment of any sour water stream regardless of its source, the invention is of particular significance for treating geothermal condensates.

In a geothermal power plant, geothermal steam is used to power a steam turbine which is connected to an electric power generator. The exhaust steam from the turbine is supplied to a condenser, and the resultant steam condensate is removed for reuse or discard. In prior art processes about $\frac{1}{3}$ of the condensate is discarded, usually after cooling tower treatment. Geothermal steam contains dissolved hydrogen sulfide in amounts which may range, for example, from as low as about 5 ppm to as high as about 1600 ppm and typically may average about 150 ppm to 250 ppm. Dependent upon the type of condenser and its efficiency, a significant percentage, e.g., as much as 80%, of the hydrogen sulfide in the geothermal steam will end up as dissolved hydrogen sulfide in the condensate. This sour water stream must be treated to remove hydrogen sulfide in order to avoid environmental pollution.

U.S. Pat. No. 4,076,621 discloses a process for removing hydrogen sulfide from sour water by air stripping the dissolved hydrogen sulfide from the sour water and then scrubbing the air stream with an aqueous solution of chelated iron. U.S. Pat. Nos. 4,414,817; 4,451,442; and 4,468,929 disclose processes for removing hydrogen sulfide from geothermal steam or condensate using an aqueous solution containing at least the stoichiometric amount of a chelated polyvalent metal. U.S. Pat. No. 4,363,215 discloses a process for removing hydrogen sulfide from geothermal steam condensate using hydrogen peroxide and an iron chelate catalyst. U.S. Pat. Nos. 4,614,644 and 4,629,608 disclose processes for removing hydrogen sulfide from geothermal steam using a chelated iron solution and a cationic polymeric catalyst. U.S. Pat. Nos. 4,451,442; 4,468,929; and 5,057,292 disclose processes for removing hydrogen sulfide from geothermal steam condensate including loss of iron chelate catalyst that is replaced at the same rate of loss.

The known sour water treatment processes that rely on the use of chelated polyvalent metal solutions, e.g. chelated iron, are complex and have disadvantages, such as excessive consumption or discard of expensive polyvalent metal and chelating agent.

One method of treating geothermal steam condensate, currently being practiced, is shown in FIG. 1. In accordance with the prior art method shown in FIG. 1, sour condensate is processed by directing about $\frac{2}{3}$ of the condensate to the top of a cooling tower, where most of the condensate is cooled and evaporated, and the remaining about $\frac{1}{3}$ of the sour condensate is directed to deep well disposal, reinjecting the $\frac{1}{3}$ of the condensate into the geological formation near its origin. Sufficient sour condensate is directed into the cooling tower to provide a slight excess of condensate that is received in a cooling tower collection tray or basin to ensure that sufficient condensate is available for recycle to the steam condenser. The excess condensate received in the cooling tower collection basin is directed to deep well disposal together with the portion of the condensate that is not directed to the cooling tower.

Polyvalent metal chelate catalyst solution, e.g., iron chelate solution, is required for removal of dissolved hydrogen sulfide contained in the sour steam condensate and the polyvalent metal chelate solution lost to deep well disposal can be added to the sour condensate either prior to the condensate entering the cooling tower, or in the cooling tower collection basin, as shown in FIG. 1.

In accordance with the present invention, at least 90% by weight of the polyvalent metal is retained for continuous recirculation, without more than 10%, and preferably less than 5% by weight loss of sour condensate and polyvalent metal to disposal, requiring only the addition of chelon to the process due to chelon degradation, without substantial losses of polyvalent metal. Some blowdown or removal of water and polyvalent metal from the cooling tower basin may be required, up to about 10% by weight, and preferably 0-5% discard of condensate, to limit the concentration of salts in the water recirculated to the condenser. It is understood that this blowdown (0-10%, preferably 0-5% of the condensate) will contain a small amount of fully chelated iron, which must be replaced by the addition of a small amount of fully chelated iron to the system. However, because the water lost by evaporation is replaced by condensation of steam, there should be little or no salts entering the system and it should be possible to operate with very little (0-10%, preferably 0-5%, and ideally 1-3%, e.g. 2%) blowdown.

SUMMARY OF THE INVENTION

It has been found, in accordance with the present invention, that $H_2S$ can be removed from condensed geothermal steam by a process that includes the steps of cooling and oxygenating the sour steam condensate by contacting the sour condensate with air in a cooling tower; collecting the oxygenated condensate in a cooling tower collection basin and initially adding a polyvalent metal chelate catalyst, e.g., iron chelate catalyst solution, to the sour condensate at a very low concentration, e.g., about 0.1 ppm to about 10 ppm, preferably about 0.5 ppm to about 1 ppm by weight, and periodically or continuously adding, to the solution, a chelating agent for the polyvalent metal to account for chelon degradation to maintain active polyvalent metal chelate solution at a concentration of about 0.1 ppm to about 10 ppm, preferably about 0.5 ppm to about 1 ppm by weight. The dissolved $H_2S$ is removed, by oxidation to sulfur, without the addition of a substantial amount (0-10% maximum, continuously or periodically) of polyvalent metal, e.g., iron, to the solution, and without substantial blowdown (0-10%, preferably 0-5% by weight) of the condensate circulated through the cooling tower.

This process operates without the blowdown of chelated iron solution, or with very little blowdown of chelated iron solution, so that retention time of the sour water in the system is unlimited, or at least 3 days, preferably at least about 1 week, to provide a unique process in this art permitting complete, or near-complete (at least 90%) retention of iron or other heavy metal. Only chelating agent is required to replace any chelating agent that has degraded due to the longer retention time in the recirculation loop, and at most 10%, preferably 5% or less polyvalent metal, e.g., iron, replacement is needed as an additive to replace the polyvalent metal, if any, lost in the reduced blowdown. By the addition of substantially only chelating agent, without the need to replace more than 10%, preferably 5% or less of the polyvalent metal, e.g., iron, substantial cost savings are realized.

In a preferred embodiment, the present invention is directed to a process for removing low levels of dissolved hydrogen sulfide, e.g., up to about 500 ppm by weight, and usually less than about 300 ppm by weight, from geothermal steam condensate by catalytically oxidizing the dissolved $H_2S$ to elemental sulfur by contact with a chelated polyvalent metal redox solution, e.g., iron chelate solution, when the iron of the iron chelate solution is in its ferric iron valence state, with concomitant reduction of ferric chelate to ferrous chelate. The ferrous chelate is regenerated to the ferric state in the cooling tower by intimate contact with ambient air.

Surprisingly, it has been found that the chelated polyvalent metal catalyzed removal of dissolved $H_2S$ from geothermal steam condensate can be achieved substantially without loss of the polyvalent metal, since the process is continuous without any, or with substantially less (0-10%) discard of the condensate solution containing the polyvalent metal. The process and apparatus of the present invention can operate with only the addition of chelating agent to replace chelating agent that degrades with time due to a closed recirculation loop, providing infinite residence time of the polyvalent metal in the circulation loop, without discard or replacement of polyvalent metal; or, preferably, the process of the present invention operates with 10% or less discard of condensate, preferably about 1% to about 3% condensate discard, as described in more detail in the following detailed description.

Accordingly, one aspect of the present invention is to provide a novel and improved process and apparatus for the treatment of sour water which has important advantages over the processes and systems heretofore proposed.

Another object of the present invention is to provide a process and apparatus of the foregoing character which utilize an aqueous polyvalent metal chelate solution as a catalyst for removal of dissolved $H_2S$ from a geothermal steam condensate, e.g., an aqueous ferric iron chelate solution, and continuously added or periodically added chelating agent, without continuous or periodic polyvalent metal addition; or with 10% or less blowdown of condensate and polyvalent metal chelate solution, thereby requiring 10% or less, preferably 5% or less by weight continuous or periodic addition of polyvalent metal, e.g. iron, with substantially more addition of chelon to replace degraded chelon due to the substantially increased residence time, in a novel and improved manner such that the cost of heavy metal, e.g., iron, is substantially reduced due to the fact that the process operates efficiently without adding a substantial amount of heavy metal after start-up.

DETAILED DESCRIPTION OF THE PREFERRED EMBODIMENTS

This invention utilizes a continuous recirculating method and apparatus for oxidizing dissolved $H_2S$ to elemental sulfur, wherein the oxidation reaction is catalyzed with a heavy metal, e.g., iron, chelate solution. In the preferred embodiment, the sour water containing dissolved hydrogen sulfide is contacted with an aqueous ferric iron chelate catalyst solution containing dissolved oxygen that has a relatively low iron chelate concentration in the range of about 0.1 ppm to about 10 ppm by weight. The dissolved oxygen in the oxygenated catalyst solution is relied upon as the primary oxidant for oxidizing hydrogen sulfide to elemental sulfur, and the chelated iron functions primarily as a catalyst for the oxidation reaction. The liquid condensate is intimately contacted with air, e.g., in a cooling tower, to convert the ferrous iron chelate to catalytic ferric iron chelate for continuous oxidation of dissolved $H_2S$ to elemental sulfur.

The combined liquid mixture of catalyst solution and sour water can be completely retained in the system, except for evaporated water condensate that vaporizes in the cooling tower, or, in a preferred embodiment, up to 10% by weight of the condensate, preferably about 1% to about 5% of the condensate is discarded during the continuous process.

Figure 1:
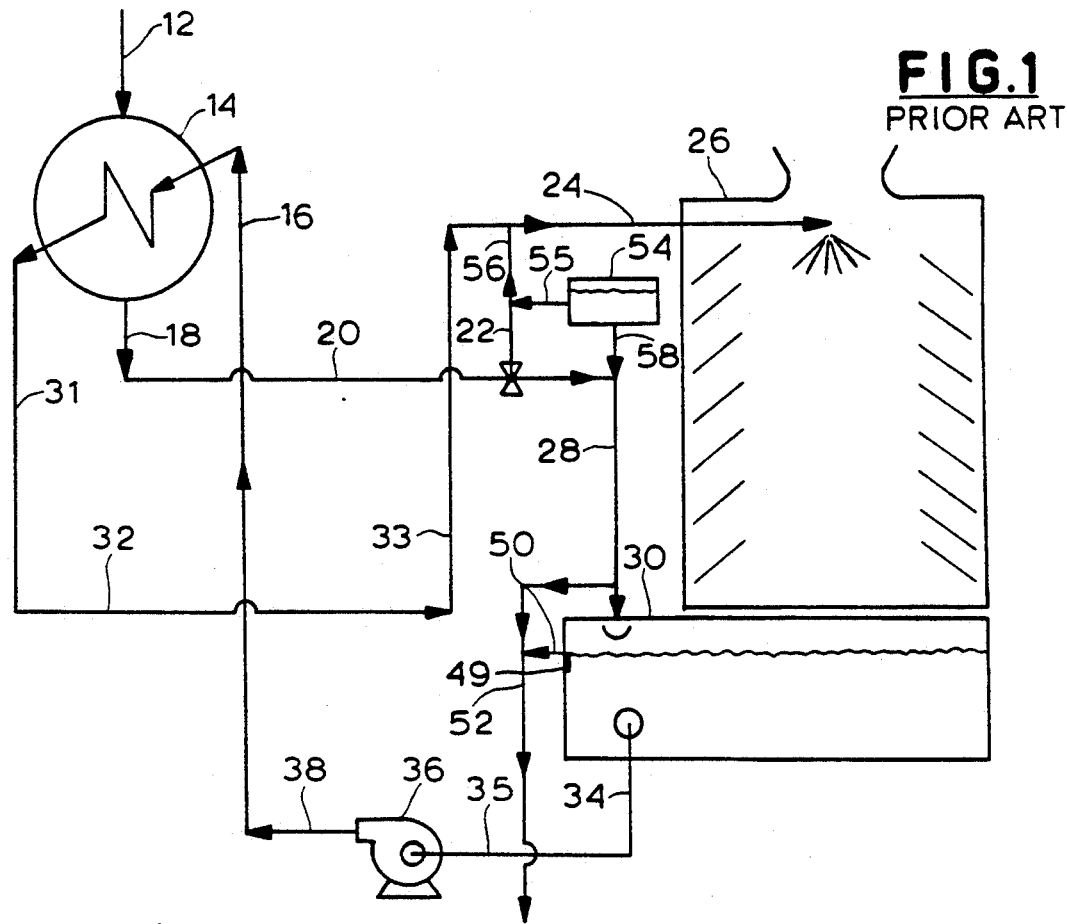
FIG. 1 is a schematic flow diagram of one prior art method of removing dissolved $H_2S$ from a geothermal steam condensate.

FIG. 1 schematically illustrates a prior art process for the oxidation of hydrogen sulfide contained in a liquid stream produced by the condensation of geothermal steam. As shown in FIG. 1, geothermal steam used to power a steam turbine, that generates electric power, is conveyed through conduit 12 to a condenser 14. Cooling water containing chelated iron (ferric chelate), or other appropriate chelated heavy metal catalyst, having a concentration of about 0.1 ppm to about 10 ppm by weight, is directed into condenser 14 through conduit 16 where the geothermal steam is condensed, and the condensate, containing dissolved $H_2S$, is conveyed by gravity or pump through conduits 18, 20, 22 and 24 to the top of a cooling tower 26; or fed through conduits 18, 20 and 28 to a cooling tower collection basin 30. Similarly, the cooling water, heated in condenser 14, is recycled to the top of the cooling tower 26 through conduits 31, 32, 33 and 24. From collection basin 30, the steam condensate, containing a very small concentration of iron chelate catalyst, for example, about 0.1 ppm to about 5 ppm iron chelate catalyst, is recycled through conduits 32 and 35, pump 36, and conduits 38 and 16 to the condenser 14 for heat transfer with, and condensation of, the steam entering condenser 14 through conduit 12.

In the cooling tower 26, an amount of water equal to approximately 65% to 80% of the condensed steam sent to the top of the tower 26 is evaporated by air flow upwardly through the tower. The excess condensed steam which is not evaporated in the cooling tower 26 overflows a weir 49 at the outlet of the collection basin 30 for disposal into a deep geological well (not shown) via conduits 50 and 52. This discarding or "blowdown" of excess condensate depletes the iron chelate solution needed to catalyze the oxidation of $H_2S$ to elemental sulfur so that make-up iron chelate solution is periodically or continuously added, from iron chelate supply vessel 54, to the top of cooling tower 26 via conduits 56 and 24. Alternatively, the make-up iron chelate solution is added to the collection basin 30 through conduits 58 and 28, as disclosed in U.S. Pat. No. 5,057,292.

When the make-up iron chelate solution is added to the collection basin 30, the dissolved hydrogen sulfide is oxidized in the collection basin 30 before the condensate enters the top of the cooling tower 26. When the make-up iron chelate solution is added through conduit 24 at the top of the cooling tower 26, the dissolved $H_2S$ is oxidized to elemental sulfur in the cooling tower and in the collection basin 30; and, in both cases, the elemental sulfur and non-evaporated condensate are collected in the collection basin 30. The air flow and time of contact between the air and water in the cooling tower 62 is sufficiently long so that the ferrous chelate, which results from the oxidation of the dissolved hydrogen sulfide to elemental sulfur, is reoxidized fully to the active ferric state as it passes down through the cooling tower 26. Concurrently, the water is oxygenated in cooling tower 26.

Figure 2:
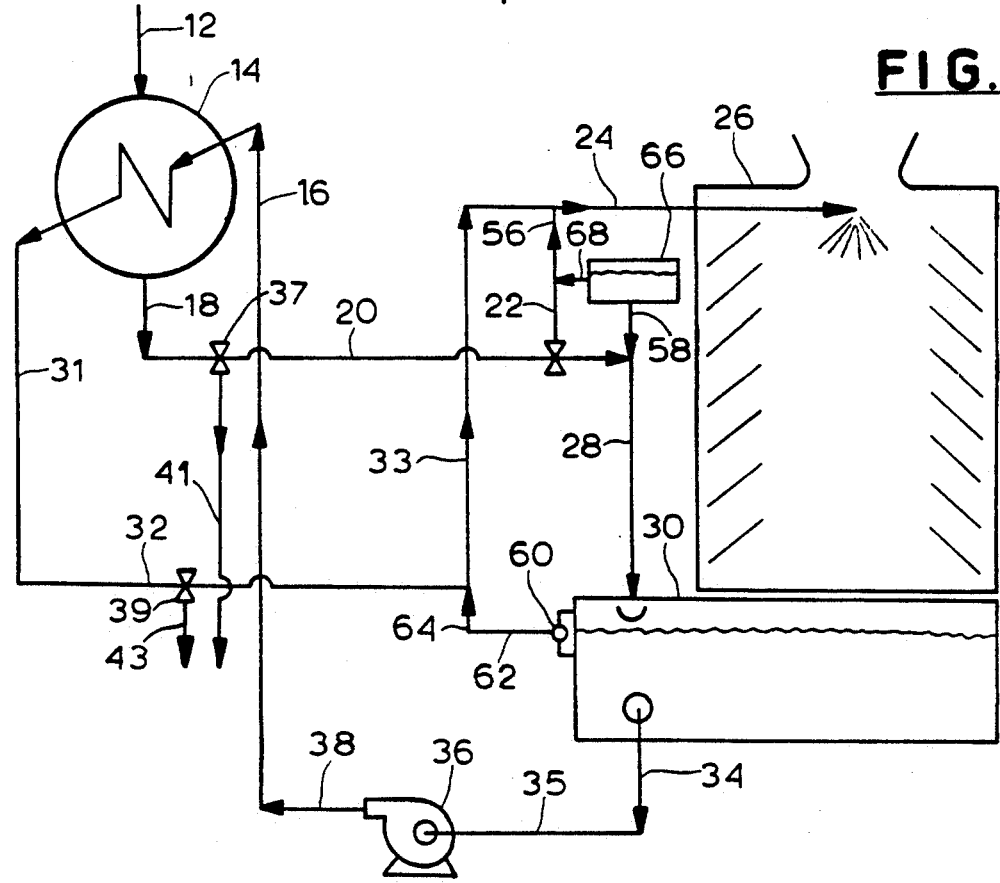
FIG. 2 is a schematic flow diagram of the method and apparatus of the present invention for removal of dissolved $H_2S$ from a geothermal steam condensate, without requiring polyvalent metal replacement.

The preferred embodiments of the process of the present invention are schematically illustrated in FIG. 2, and include many of the same identically numbered parts and process steps as those described above with reference to FIG. 1, with important exceptions. In the prior art, it is always essential to dispose of a substantial portion, e.g., one-third, called "blowdown", of the condensate that is not evaporated in the cooling tower 26, as shown being discarded through conduit 52 in FIG. 1. This substantial blowdown necessitated the addition of iron chelate solution to the process to maintain sufficient catalyst for the oxidation of dissolved $H_2S$ to elemental sulfur. Contrary to the teachings of the prior art, the process of the present invention can maintain a closed recirculation loop, without discard of condensate so that no iron or other polyvalent metal is lost; or in the more desired form of the method of the present invention, a small portion, of about 1% to about 10% by weight of the condensate is discarded, preferably about 1% to about 5% by weight discard, with a corresponding loss of polyvalent metal chelate solution. This, 1-10%, small amount of blowdown is advantageous, and oftentimes required, to control the concentration of salts in the cooling circuit, but contrary to the teachings of the prior art, only a very small amount of polyvalent metal is lost when practicing the method of the present invention.

As shown in FIG. 2, all of the condensate formed in condenser 14 flows through conduits 18 and 20 and then flows either through conduits 22, 56 and 24 to the top of the cooling tower 26; or flows through conduit 28 to the collection basin 30. In the preferred embodiment, a small portion of the condensate formed in condenser 14 and/or a small portion of the cooling water flowing through the condenser 14 and conduits 31 and 32 (totalling 10% or less, preferably about 1% to about 3% by weight of the total solution flowing through conduits 18 and 31) is discarded via valves 37 and 39 and conduits 41 and/or 43, to deep well disposal. A level control valve 60, operatively connected to collection basin 30, maintains a desired level of condensate solution in the collection basin 30 so that any excess condensate, above an amount required to maintain the desired condensate solution level in the collection basin 30, can be recycled through level control valve 60 and conduits 62, 64, 33, and 24 to the top of cooling tower 26 for evaporation. In this manner, only 0 to about 10% of the iron contained in the condensate solution is lost.

The process shown in FIG. 2 can have an unlimited retention time for the iron portion of the iron chelate solution if non of the condensate is removed from the recirculation loop. In the preferred embodiment about 1% to about 3% of the condensate, and iron chelate solution are discarded to deep well disposal to prevent excessive build up of salts in the recirculated solution. Whenever sulfur oxidation is accomplished by chelated iron-catalyzed oxidation, the chelon of the iron chelate solution decomposes slowly, probably as the result of free radial production during the reoxidation of reduced iron. The rate of decomposition is often described in terms of the "half life" of the chelon, which may be as short as 5 to 10 hours.

As the chelons degrade, the iron will precipitate as ferric oxide or ferrous sulfide, and the catalytic activity of the iron chelate solution will, in time, be completely lost. Accordingly, make-up chelate solution must be added periodically or continuously to the condensate solution being recycled to maintain sufficient catalytic activity to achieve the catalytic oxidation of dissolved $H_2S$ in the condensate solution to sulfur. Accordingly, chelate solution is supplied to the condensate, periodically or continuously, from chelate solution supply vessel 66. The make-up chelate solution can be supplied to the condensate at any point in the process, and is shown in FIG. 2 being added alternatively either through conduits 58 and 28 to the collection basin 30; or through conduits 68, 56 and 24 to the top of the cooling tower 26. Sufficient chelate solution is added periodically or continuously from chelate solution supply vessel 66 to provide, continuously, about 0.1 ppm to about 10 ppm by weight of active iron chelate, based on the entire weight of the non-evaporated condensate continuously recirculating through the entire process and apparatus, as shown in FIG. 2.

Elemental sulfur is formed during the oxidation reaction in the conduits, cooling tower 26 and collection basin 30, and the fine sulfur particles, e.g., in the 0.1 to 5 μm range, are collected in the collection basin 30. Because of the low levels of $H_2S$ dissolved in the condensate, the collected sulfur can be removed very infrequently, e.g., yearly. Multiple alternative collection basins 30 (not shown) can be provided so that one collection basin can be in use at all times while the sulfur is being removed from another, or the process can be shut down for a short period of time, e.g., yearly, to remove the elemental sulfur from collection basin 30. Optionally, if sulfur recovery is desirable, the condensate solution may be filtered or settled for sulfur removal. For example, a separate sulfur settler (not sown) may be connected to the collection basin 30, and a side stream of sulfur-containing liquid may be supplied to the settler. In the settler, the sulfur particles are allowed to agglomerate to a large particle size, typically in the 10–20 μm range, which settle into a cone-shaped bottom portion of the settler to form a 10–20 wt. % slurry. The slurry may then be passed through a heater or heat exchanger to melt the sulfur. The mixture of aqueous iron chelate catalyst solution and molten sulfur then is introduced into a separator from which the molten sulfur phase is withdrawn to a storage pit (not shown) and the iron chelate/condensate solution recycled to the process to avoid loss of iron.

The above-described process of FIG. 2 provides new and unexpected advantages in polyvalent metal, e.g., iron, savings while providing excellent efficiency of at least 90%, and generally at least 95% reduction of dissolved $H_2S$ in the steam condensate.

The process of the present invention differs significantly from the process of U.S. Pat. Nos. 4,784,775 and 5,057,292, including the direct reinjection of about ⅓ of the sour water into the disposal well without first flowing the sour water through the cooling tower; or routing the condensate to the cooling tower and reinjecting only cooling tower basin overflow. The process of the present invention is distinct from the prior art processes, in that any water discarded from the process (the blowdown) is a much smaller volume than discarded in the prior art. In the prior art, the iron loss rate was dependent on the substantial amount of cooling tower blowdown, rather than the rate of degradation of chelon in the polyvalent metal redox catalyst solution.

Also, in the process of U.S. Pat. No. 5,057,292, the residence time of the water in the reaction system is simply the volume of the reaction vessel divided by the liquid feed rate (60 minutes in the case of one commercial entity), whereas the residence time in the cooling tower of the present invention can be very long since little blowdown (0–10%) is taken, e.g., at least about 2 days, and usually about 5–10 days, and most of the excess water (0–10%) to be reinjected to the deep disposal well can be withdrawn as sour condensate through conduits 41 and/or 43 upstream of the cooling tower. This substantial residence time introduces the element of chelon degradation into the process of the present invention, or, in the typical operation, that of chelon auto-oxidation.

Auto-oxidation results in the destruction of the chelating agents by oxidation which is related to the oxidation of $H_2S$ to sulfur. The chelating agents and iron chelates are extremely stable against oxidation at temperatures in the 50° to 150° F. range, and all of the chemicals have shelf lives of two or more years. However, when oxidation of $H_2S$ is taking place, there is a concurrent, but slower oxidation of some of the chelating agents, so that without the addition of free chelons, the iron would gradually become insoluble in the water and would precipitate either as ferric hydroxide, ferrous hydroxide or iron sulfide.

In the process of the present invention, there is now a long residence time, for example, approximately 7.5 days at 100 gallons per minute blowdown, in a process that treats about 6,000 gallons per minute of sour condensate, and the degradation of the chelating agents is a much larger factor in the chemical consumption than is the discard of chelated iron with the blowdown.

Determining the rate at which the $H_2S$ must be removed, the iron concentration necessary to achieve this level and the rate of chelon addition required to maintain the desired catalyst activity, are all relatively straightforward, as shown in the following example.

EXAMPLE

A geothermal power recovery system, using the present invention, generates about 80 MW of power by processing geothermal steam through a turbine to a surface condenser. The steam flow is about 1,200,000 lb./hr. (about 6,087 gallons/min.) and contains 80 ppm or 96 lb./hr. of dissolved $H_2S$. The air flow through the cooling tower is on the order of 500,000 standard cubic feet per minute (SCFM) or 30,000,000 standard cubic feet per hour (SCFH). The prior art process used to bring about the oxidation of the $H_2S$, as shown in FIG. 1, has been the addition of chelated iron (e.g., HEDTA Chelated Iron solution) to the cooling tower basin 30. The addition rate has been set according to the rate of overflow of cooling water from the cooling tower basin 30 to a reinjection well, and this was, in turn, set by the difference between the amount of water which had to be evaporated from the cooling tower to provide adequate cooling of the condenser and the amount of condensate produced in the condenser. The amount of blowdown has averaged several hundred gallons per minute in the past, but has been reduced sharply by the preferred practice of the present invention by continuously or periodically discharging a small portion, e.g., about 1% to about 5% by weight of the condenser water directly to the disposal well via conduits 41 and/or 43 (FIG. 2) without first passing it through the cooling tower 26. This has reduced the blowdown from the cooling tower 26 to about 100 GPM or so, and has also reduced the amount of $H_2S$ entering the cooling tower.

In order to reduce the $H_2S$ content of the cooling tower effluent air to 5 parts per billion (ppb), to insure freedom from detectable odors, in the preferred embodiment, the total $H_2S$ emission rate must be decreased from 16.2 lb./hr. to:

ARI-340
USE = $30,000,000 \times 5 \times 10^{-9} \times 34/379 = 0.0108$ lb./hr.

Substantially all of the condensate entering the cooling tower will be evaporated, so the efficiency of removal of H$_2$S from the condensate must be:

Efficiency,
% = 100×(1−0.0108/16.2)/16.2=99.93%

This is a higher level of efficiency than is achieved in the process of U.S. Pat. No. 4,784,775 because of the low concentration selected to assure odor freedom in the discharge air from cooling tower 26. However, the residence time is very long and the calculated concentration of iron required for reaching the efficiency indicated is less than 0.1 ppm of properly chelated iron supplied, for example, as ARI-340 catalyst concentrate. This material (ARI-340) has a concentration of approximately 50,000 ppm, so the calculated rate of loss of iron from the system with 100 gallons per minute (GPM) of blowdown is only:

Chelated Iron Concentrate Loss, lb./hr.=100
GPM×500×0.1/50,000=0.1 lb./hr.

or about 16 lb./week. This is a trivial amount, and it would be reasonable to add concentrate to maintain a more easily measurable concentration, such as 1 ppm, or about 1 lb./hr., to be on the safe side.

The addition of chelon concentrate to replace the chelons destroyed by oxidative degradation is a more significant amount. This has been estimated on the basis that 20% of the H$_2$S entering the system will be converted to Na$_2$S$_2$O$_3$, which will leave with the relatively small blowdown stream. Again, assuming 100 GPM of blowdown, the thiosulfate concentration in the cooling tower basin will be:

Na$_2$S$_2$O$_3$, wt. ppm=16.2×0.2/(100×500)=65 ppm

This is too low to provide any stabilizing effect whatever, and the degradation rate has been estimated as 0.50 lb. ARI-350 per lb. of sulfur produced, or:

ARI-350 Usage, lb./hr.=16.2×0.50=8.1
lb./hr.=0.8 GPH

The degradation rate of the chelon composition used in the formulations of ARI-340 and ARI-350 is considerably lower than that of the more common chelons, EDTA and HEDTA, using essentially an equimolar blend of nitrilotriacetic acid and EDG, and the chelon consumption rate at the low stabilizer concentration is likely to be on the order of 25% of the chelons presently in use, with residence time for the chelated iron at least double, and usually at least three times as long as in the prior art.

The present invention contemplates the use of any chelated iron solution or other suitable chelated polyvalent metal catalyst or mixture of polyvalent metal catalysts having a polyvalent metal capable of oxidation and reduction to both a higher and a lower oxidation state and which is operable for removing hydrogen sulfide.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A process for removing H$_2$S from an aqueous condensate containing dissolved H$_2$S which comprises:
    including with the condensate a chelated polyvalent metal catalyst in an amount sufficient to oxidize the dissolved H$_2$S to sulfur;
    introducing the condensate containing the catalyst to a cooling tower from which it flows downwardly against an upward flow of air to cool and oxygenate the condensate and evaporate a portion of the condensate;
    forming a recycle liquid in the cooling tower comprising cooled and oxygenated condensate;
    collecting the recycle liquid in a water collection basin;
    recycling the recycled liquid for reuse;
    periodically removing and discarding from the process about 1% to about 10% of the recycle liquid after heat exchange with and condensation of a vaporized liquid containing H$_2$S, but before the recycle liquid is recycled to the cooling tower;
    adding a chelated polyvalent metal to the condensate in an amount equal to the amount of recycle liquid removed and discarded from the process; and
    periodically or continuously adding a chelon, without polyvalent metal, to the condensate in an amount greater than the amount of polyvalent metal added to the condensate, and in an amount sufficient to maintain the polyvalent metal catalyst sufficiently active to oxidize the dissolved H$_2$S and provide, continuously, an amount of active polyvalent metal catalyst in the condensate of about 0.1 ppm to about 10 ppm by weight.

2. The process of claim 1, wherein the catalyst is an iron chelate solution.

3. The process of claim 1, wherein the amount of recycle liquid discarded and polyvalent metal added is about 1% to about 5% by weight of the recycle liquid.

4. The process of claim 2, wherein the concentration of dissolved H$_2$S in the condensate is up to about 500 ppm.

5. The process of claim 4, wherein the concentration of dissolved H$_2$S in the condensate is less than about 300 ppm.

6. The process of claim 1 wherein the polyvalent metal is continuously added in an amount of about 1% to about 10% based on the weight or recycle liquid, and wherein an amount of chelon equal to about 0.25 to 1.0 pound per pound by sulfur produced is continuously added to the condensate solution prior to introducing the condensate to the cooling tower.

7. A continuous process for removing H$_2$S from condensed geothermal steam containing dissolved H$_2$S comprising the steps of:
    exchanging heat from the geothermal steam with a recycle liquid in a condenser to form a heated recycle liquid and a sour condensate containing dissolved H$_2$S;
    including with the sour condensate a chelated iron catalyst in an amount sufficient to oxidize the dissolved H$_2$S to sulfur;
    combining the heated recycle liquid and sour condensate to form a combined condensate;
    introducing the combined condensate to a cooling tower in which the combined condensate flows downwardly against an upward flow of air to cool and oxygenate the combined condensate and evaporate a portion of the combined condensate leaving a recycle liquid;

collecting the recycle liquid in a water collection basin;

recycling the recycle liquid to the condenser for heat transfer with geothermal steam for continuous formation of additional sour condensate;

periodically removing and discarding from the process about 1% to about 10% of the recycle liquid after heat exchange with and condensation of a vaporized liquid containing $H_2S$, but before the recycle liquid is recycled to the cooling tower; and adding a chelon to the condensate in an amount sufficient to maintain the activity of the iron chelate catalyst and provide, continuously, an amount of active iron chelate catalyst in the condensate sufficient to oxidize the dissolved $H_2S$ to sulfur.

8. The process of claim 7, wherein the amount of recycle liquid condensate discarded and polyvalent metal added is about 1% to about 5% by weight of the recycle liquid condensate.

9. The process of claim 7, wherein the concentration of dissolved $H_2S$ in the condensate is up to about 500 ppm.

10. The process of claim 9, wherein the concentration of dissolved $H_2S$ in the condensate is less than about 300 ppm.

11. The process of claim 7, wherein the polyvalent metal is continuously added in an amount of about 1% to about 10% based on the weight of recycle liquid, and wherein an amount of chelon in the range of 0.25 to 1.0 pound per pound of sulfur produced is continuously added to the sour condensate.

12. The process of claim 11, wherein the polyvalent metal and chelon are added to the combined condensate before the combined condensate is introduced to the cooling tower.

* * * * *